Figure 1:
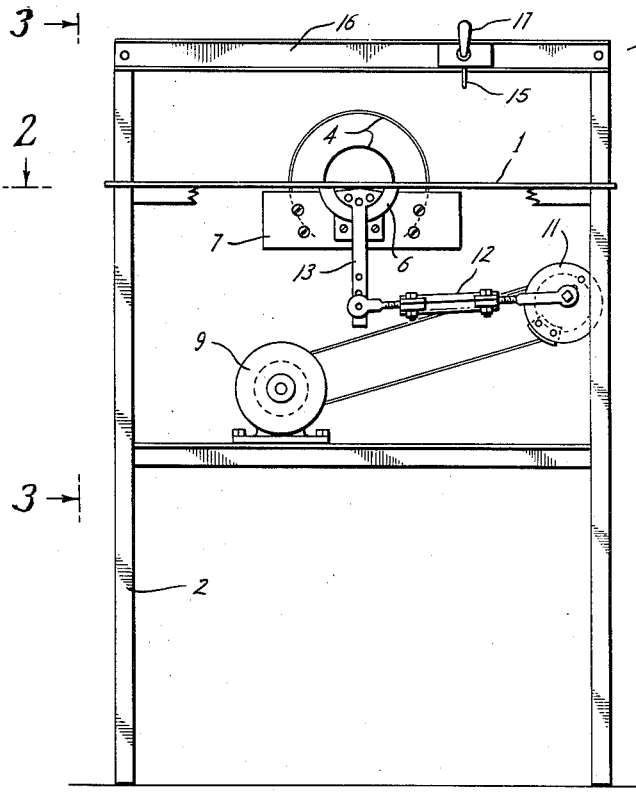

July 1, 1958     P. E. PETROFSKY     2,841,193
MACHINE FOR SAWING SPONGE-LIKE CELLULAR GLASS
Filed March 2, 1956     2 Sheets-Sheet 1

P. E. Petrofsky
INVENTOR.

BY G. C. Helmig

ATTORNEY

July 1, 1958 P. E. PETROFSKY 2,841,193
MACHINE FOR SAWING SPONGE-LIKE CELLULAR GLASS
Filed March 2, 1956 2 Sheets-Sheet 2

P. E. Petrofsky
INVENTOR.

BY G C Helmig

ATTORNEY

United States Patent Office 2,841,193
Patented July 1, 1958

2,841,193

MACHINE FOR SAWING SPONGE-LIKE CELLULAR GLASS

Paul E. Petrofsky, Houston, Tex., assignor to The Aber Company, Houston, Tex., a corporation of Louisiana Application March 2, 1956, Serial No. 569,174

2 Claims. (Cl. 143—85)

Pipes for conducting steam or other fluids whose temperatures may be greater or less than temperatures outside of the pipes are usually covered in heat insulation jackets. A pipe jacket currently popular because of its excellent insulation quality, its resistance to weathering, moisture, oxidation and deterioration under normal conditions, is one applied as two half-cylinders brought together to surround an installed pipe and formed of Foamglas, which is a light weight and rigid silicate having a honeycomb or spongelike appearance and containing a multiplicity of minute dead air cells sealed within thin membranes or webs of the glass material. As initially produced, the inorganic cellular glass is usually of block or slab form, and desired shapes are made by shearing or crushing the brittle thin connecting webs or cellular columns along predetermined lines which define the final shape outline.

The present invention deals with an improved machine for severing shapes from pieces of Foamglas or the like and more particularly with a simplified design of structure which can be readily put together at low cost and operated without the need of special skill to quickly and accurately form the desired shape.

An object of the invention is to provide an improved machine having a work supporting table top beneath which is mounted an oscillatory shaft whose axis substantially coincides with the flat plane containing the work supporting surface and which shaft carries an attachment coupling for one or more saw blades, each mounted to project upwardly above the table top and to follow a path of curvature through which the blade moves with shaft oscillation and whose operating path center intersects the table top surface so that a Foamglas blank can be rested with its flat underside on the table top and shiftably slid thereon to pass the oscillating saw blade, which thereupon breaks through the brittle wall and cleaves out a semi-round surface whose opposite ends will lie in diametrically opposite relation to the center of the half-round surface.

A further object of the invention is to provide an improved sawing machine in which the shaft coupling for the saw blades enables the blades to be removably and adjustably mounted so that broken or worn blades can be easily replaced and the setting of the individual flexible blades or a group of blades varied as to arcuate length and radius of cutting action, whereby the size and wall thickness of the finished piece can be made to predetermined specifications according to given pipe diameters and heat insulation requirements.

Another object of the invention is to provide a machine for universal usage not only as to different dimensions of arcuate cuts but also as to different shapes in the axial or longitudinal direction for making semicylindrical finished pieces which can extend on straight lines or on curved lines of any of several fixed radii or on partly straight and partly curved lines, all as called for in the fitment of insulation jackets to conduit systems having straight and bent pipe.

A still further object of the invention is to provide a variable drive transmitting connection for the saw oscillating shaft whereby the length of the saw stroke and its centered relation to the table top may be readily adjusted to suit the work being done.

Figure 2:
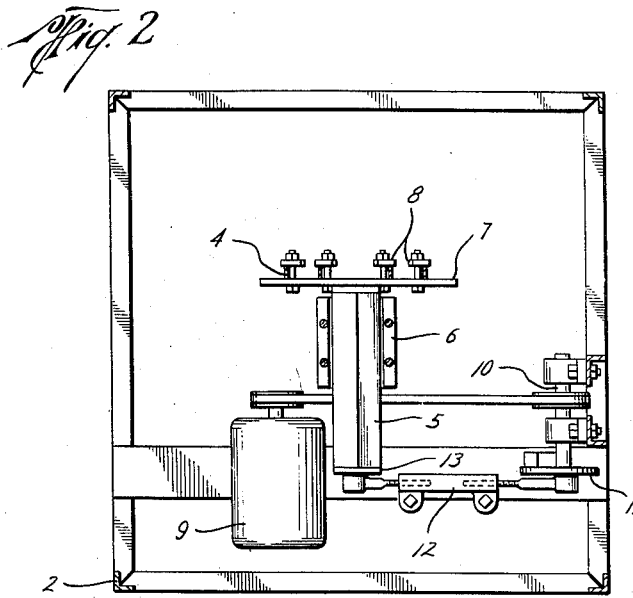
Figure 3:
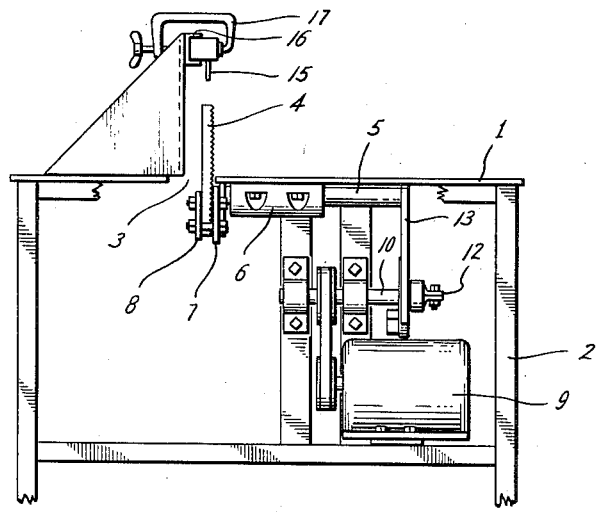
Figure 4:
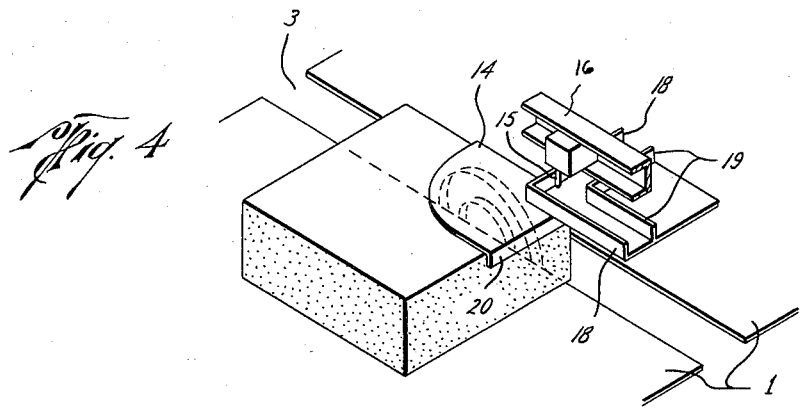
Figure 5:
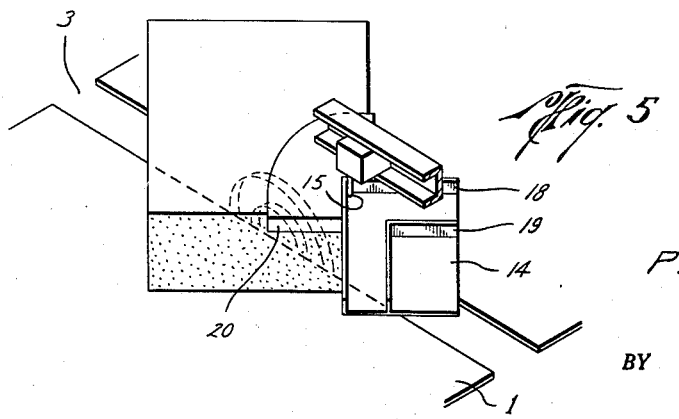

Additional objects and advantages will become apparent during the course of the following specification having reference to a preferred embodiment of the invention as illustrated in the accompanying drawings, wherein Figure 1 is a front elevation of the work table and saw arrangement; Figs. 2 and 3 are respectively a horizontal section and an end elevation as on lines 2—2 and 3—3 of Fig. 1; Figs. 4 and 5 are fragmentary perspective views of a guide fixture for a block from which a shape is being cut to fit a pipe elbow; and Figs. 6, 7, 8, and 9 (Sheet 1) are perspective views showing in succession a block from which a half angle insulation piece is to be cut, with cutting lines shown in broken lines, a solid core cut from inside, the finished piece, and the remainder of the block from which the finished piece has been cut.

Referring to the drawing, the flat table top 1, on which work can be slidably supported on a plane surface, is illustrated as being supported at a convenient working height on braced framing legs 2. The table top preferably is a fairly thin metal plate stiff enough to resist buckling and sufficiently hard to withstand abrasive wear as work pieces are slid on the upper face. Extending upwardly through a transverse clearance slot 3 between front and rear portions of the table top 1 and following curved paths in a transverse plane normal to the plane of the table top, are a pair of radially spaced apart concentric saw blades 4 presenting forwardly facing cutting teeth to the work moved toward the saw blades. Opposite ends of the blades are connected below the underside of the table top 1 to oscillate with a power driven rock or crank shaft 5. While the drawings illustrate a pair of blades, it will be understood that one or more would be used in accordance with the shape to be cut, and each blade is a flexible steel strap bent into a bow whose arcuate path above the plane of the table top defines a half-circle whose center intersects the work supporting table surface. Back and forth oscillatory movement is imparted by the rock shaft 5 to the saw blade, and its arcuate extent continues below the table top for a sufficient distance that in the complete blade stroke between opposite limits of oscillation that part of the curved saw blade above the table will always be a half-circle in the event a half-cylinder is to be formed.

As dictated by the shape to be cut, the radius of blade curvature and blade length can be varied, and for that purpose opposite ends of the blade bow are shiftably fixed by suitable adjustable connections on the mounting shaft 5 rockably held in a lubricated bearing cap 6 bolted on the underside of the table top. Adjustable blade connections conveniently can consist of a radial plate 7 welded or otherwise fixed to the rearward end of the drive shaft 5 to extend in opposite directions from and in a transverse plane normal to the shaft axis as a pair of crank arms, with a series of adjustable clamp pads 8 secured by nuts and bolts to the clamp plate 7 and for gripping thereto the saw blade end portions.

Since, as previously stated, the center of the curved path of blade oscillation should approximate the plane of the table upper surface, it follows that the axis of the mounting shaft 5 must coincide as nearly as practicable with the table top surface. Accordingly, and in compensation for table top thickness, the upper portion of the shaft is relieved, or, in other words, it is not a truly round shaft but resembles a cylindrical segment whose circular surface is lowermost and is fitted to rock within the bearing cap 6 about an elevated axis lying in the plane of the work supporting surface. To prevent looseness in the bearing, the upper face of the shaft may have a line contact with the under surface of the table top, with the upper surface recessed on both sides of the contact line, affording diverging flats affording clearance for oscillation in both directions. Working clearances between the underside of the table top 1 and the downwardly divergent upper faces of the rock shaft 5 and the top edges of the oppositely extended rock arms of the mounting plate 7, as best seen in Fig. 1, are such as to accommodate saw travel in short rapid strokes for cutting brittle Foamglas. As a result of the blade and shaft mounting as referred to, the oscillation of the assembly and the forward feed of work on the table surface and into the saw teeth will produce a semi-circular cut to form a half-cylinder shape. When two concentric blades are used, then a semicircular wall of uniform thickness can be made, as, for example, an insulating half jacket whose inside diameter approximates the outside diameter of the pipe to be covered.

For driving the shaft 5, there is shown an electric motor 9 mounted beneath the table top on the leg framework and belted to a rotary shaft 10 which carries a crank plate 11 having a series of openings, as best seen in Fig. 1, each at a different radial position and in any one of which can be selectively secured a pivot connection with one end of an adjustable turnbuckle connecting or tie rod 12 whose opposite end is pivotally joined with any one of selected radially spaced apart attachment openings of a crank or lever arm 13 whose fulcrumed end is bolted or otherwise fixed on the front end of the saw blade shaft 5. Changing the pivot connections of the tie rod 12 with the different pivotal openings in the rotatable crank plate 11 and the oscillating crank arm 13 enables the length of the saw blade stroke to be modified in relation to the size or radial dimension of a particular shape to be cut. Tie rod length adjustment enables the upper face flats of the convergent top surface of the shaft 5 to be centered or set in balanced relation to the motion transmitting parts and operating structure.

When angle shapes are to be cut to cover pipe curves or elbows, the work piece, usually a rectangular block, can be fed into the saw blades along an arcuate line on the work table. As a guide to accurate work, a fixture, as shown at 14 in Figs. 4 and 5, may be employed to bear on both sides of a work piece corner and on a compass point or fulcrum pin 15 mounted in a vertical plane containing the saw teeth and at a distance from the center of shaft oscillation corresponding to the center line radius of the pipe elbow. For fulcrum pin position adjustment to different radii, the pin 15 projects vertically from a base block which is slidably located within a channel member 16 positioned at selected height above the table for co-operation with a C-clamp 17 (Fig. 3). Alternately the fulcrum pin could be mounted on and projected above the table, but the elevated mounting is preferred inasmuch as it permits maximum use of the slide top of the table. The swinging fixture 14 can be formed of two sheet metal plates having corner portions overlapped and rigidly secured, as by welding. The lowermost plate will have downturned flanges 20 along two adjoining sides to fit the sides at one corner of the square work piece in co-operation with the plate which rests on the upper face of the block. The uppermost of the two plates can have upwardly extending side flanges 18 which converge at a corner overlying the bottom plate. The flanges 18 are for co-operative engagement with the fulcrum pin 15, and in the use of the fixture it is first fitted to the block and upon the sliding of the block upon the table top toward the fulcrum pin one of the convergent flanges 18 will strike and engage on the pin and the operator can shift the parts until the apex between the two flanges receives the pin for centering the cutting arc. The operator maintains the fixture on the block by hand pressure and exerts a slight pressure toward the fulcrum pin as the block is concurrently slid forward for the performance of the angle cut.

The convergent flanges 18 may be duplicated on the fixture at spaced intervals, as indicated by the pair of flanges 19, to enable the same fixture to be used to guide angle cuts on different sizes of block. Instead of immediately centering the fixture on the fulcrum pin in the apex of the converging flanges 18 and keeping it centered throughout the cutting operation, the operator may start an initial straight line cut by positioning the parts so that one of the flanges is in slide bearing contact with the guide pin 15 (see Fig. 4) at a given distance from the apex and start the cut with the parts in this position, moving the block toward the pin on a straight line until the corner apex is at the pin location, whereupon the swinging commences for an angle cut. Similarly a straight line cut following the completion of an angle cut can be made in the final stage by moving the block and the guide fixture on a straight line in which the other of the convergent flanges 18 slides on the fulcrum pin in a direction linearly of the flange. Cuts of varying and of compound curvature can also be made with the aid of a proper cam shaped fixture guide.

Figure 6:
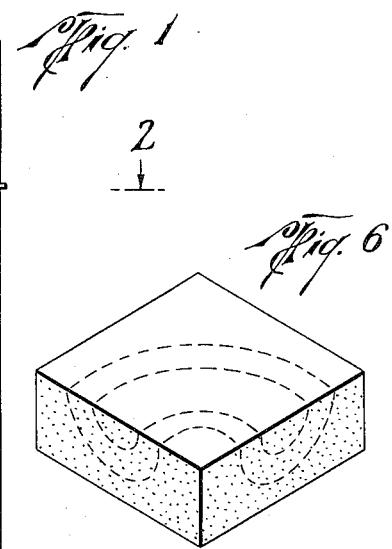
Figure 7:
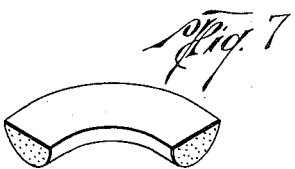
Figure 8:
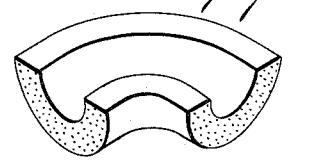
Figure 9:
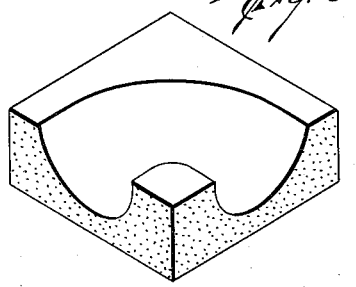

With the oscillating double blade arrangement as described and with the use of the swinging guide fixture, there will be cut through a rectangular block, such as shown in Fig. 6, two lines, each following a half-circle and being radially spaced apart, so that the finished shape or angle piece illustrated in Fig. 8 will be formed along with the solid inner core piece illustrated in Fig. 7 and the outer body piece illustrated in Fig. 9.

For purposes of disclosure, a single preferred but not necessarily the only embodiment of the invention has been described in detail and it will be understood that various modifications can be made without departing from the scope of the invention as set out in the attached claims.

What is claimed is:

1. A machine for sawing Foamglas on an arcuate line, including an oscillatory arcuate saw blade, a work feed table having its upper surface extending in a single plane diametrically across the axis of said oscillatory blade, a substantially semicylindrical bearing cap mounted beneath said table top with the cap axis coincident with the plane containing said upper surface of the table top and drive means operable to impart sawing action to said saw blade and comprising a rock shaft of substantially cylindrical segment shape held between the underside of the table top and said semicylindrical bearing cap and with the parti-cylindrical surface of the shaft facing downwardly and resting in said bearing cap and with the upper surface of the shaft in the form of a pair of angularly related flats converging to a central line bearing on the underside of the table top and said convergent flats defining clearance space with the underside of the table top at opposite limits of the range of rock shaft oscillation, a pair of outwardly extending crank arms at one end of said rock shaft, adjustable mounting connections securing said saw blade to said crank arms and an operating crank arm at the other end of said rock shaft.

2. A machine for cutting semicylindrical shapes from blanks of Foamglas or the like, including a table top having a flat work supporting surface which is devoid of upward projection to interfere with free movement in all directions of work supported thereby, an oscillating plate positioned wholly beneath said work supporting surface and carried on the underside of the said table top for oscillation about an axis coincident with the plane of said surface, a parti-circular saw blade secured at opposite ends and beneath said work supporting surface to said plate and projected above the table surface on a semi-round path whose center is aligned with the table surface, power means to oscillate said plate and said saw blade as work is fed on the table surface past the oscillating saw blade, a swinging guide for a blank from which a shape is to be cut and a pivot pin suspended above and downwardly terminated at an elevated point vertically spaced from the work supporting surface, said elevated pin being engageable with said guide and establishing therefor a swinging axis normal to said plane of the work supporting surface.

References Cited in the file of this patent

UNITED STATES PATENTS

| | | |
|---|---|---|
| 1,284 | House | Aug. 12, 1839 |
| 25,014 | Hay | Aug. 9, 1859 |
| 97,310 | Newman | Nov. 30, 1869 |
| 128,243 | Osten | June 25, 1872 |
| 157,703 | Stone | Dec. 15, 1874 |
| 173,657 | McFeeters | Feb. 15, 1876 |
| 186,944 | Nudd | Feb. 6, 1877 |
| 356,280 | Elder | Jan. 18, 1887 |
| 565,633 | Pessenger | Aug. 11, 1896 |
| 1,505,030 | Kentch | Aug. 12, 1924 |
| 1,639,039 | Knabusch et al. | Aug. 16, 1927 |
| 1,697,669 | Tautz | Jan. 1, 1929 |
| 2,577,206 | Patterson | Dec. 4, 1951 |
| 2,753,899 | Murfin | July 10, 1956 |
| 2,782,814 | Smith | Feb. 26, 1957 |

FOREIGN PATENTS

| | | |
|---|---|---|
| 1,566 | Great Britain | June 28, 1860 |